(12) United States Patent
Renz et al.

(10) Patent No.: US 12,401,085 B2
(45) Date of Patent: Aug. 26, 2025

(54) CELL MODULE HAVING A PLURALITY OF ELECTROCHEMICAL POUCH CELLS

(71) Applicant: Dr. Ing. h.c. F. Porsche Aktiengesellschaft, Stuttgart (DE)

(72) Inventors: Fadi Renz, Kornwestheim (DE); Lars Hovestadt, Tamm (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 615 days.

(21) Appl. No.: 17/854,070

(22) Filed: Jun. 30, 2022

(65) Prior Publication Data

US 2023/0014713 A1  Jan. 19, 2023

(30) Foreign Application Priority Data

Jul. 16, 2021 (DE) ............................. 102021118402

(51) Int. Cl.
  *H01M 50/54* (2021.01)
  *H01M 10/647* (2014.01)
  (Continued)

(52) U.S. Cl.
  CPC ....... *H01M 50/296* (2021.01); *H01M 10/647* (2015.04); *H01M 10/655* (2015.04);
  (Continued)

(58) Field of Classification Search
  CPC ............. H01M 50/296; H01M 10/647; H01M 10/655; H01M 50/211; H01M 50/249; H01M 50/273; H01M 50/46; H01M 50/547; H01M 50/553; H01M 50/566; H01M 10/052; H01M 10/653; H01M 50/107; H01M 50/213; H01M 50/293;
  (Continued)

(56) References Cited

U.S. PATENT DOCUMENTS

2003/0157406 A1* 8/2003 West ................... H01M 10/285
    429/229
2004/0234849 A1* 11/2004 Akita .................. H01M 50/533
    429/211
(Continued)

FOREIGN PATENT DOCUMENTS

DE     102014117396 A1    6/2016
KR        102172931 B1 *  2/2017
KR       20170019332 A    2/2017

*Primary Examiner* — Christian Roldan
(74) *Attorney, Agent, or Firm* — Buchanan Ingersoll & Rooney PC

(57) ABSTRACT

A cell module has a plurality of electrochemical pouch cells. Each pouch cell has at least a first and second electrode, a separator arranged between the electrodes, and a flexible outer sleeve. Each pouch cell has a circular outer rim and a circular through-hole arranged in the center of the pouch cell. An outer cell terminal is arranged on the outer rim of each pouch cell, and an inner cell terminal is arranged on an inner rim of the through-hole. The cell module has an inner current collector in the form of a cylindrical rod and an outer current collector in the form of a cylinder jacket. The inner current collector extends along a mid-axis of the cell module, and the outer current collector is arranged concentrically with respect to the inner current collector.

13 Claims, 4 Drawing Sheets

(51) Int. Cl.
  *H01M 10/655* (2014.01)
  *H01M 50/211* (2021.01)
  *H01M 50/249* (2021.01)
  *H01M 50/273* (2021.01)
  *H01M 50/296* (2021.01)
  *H01M 50/46* (2021.01)
  *H01M 50/547* (2021.01)
  *H01M 50/553* (2021.01)
  *H01M 50/566* (2021.01)

(52) U.S. Cl.
  CPC ....... *H01M 50/211* (2021.01); *H01M 50/249* (2021.01); *H01M 50/273* (2021.01); *H01M 50/46* (2021.01); *H01M 50/547* (2021.01); *H01M 50/553* (2021.01); *H01M 50/566* (2021.01)

(58) Field of Classification Search
  CPC .. H01M 50/503; H01M 50/514; H01M 50/54; H01M 50/545; H01M 50/105; H01M 50/204; H01M 50/502; Y02E 60/10
  USPC ......................................................... 429/127
  See application file for complete search history.

(56) References Cited

U.S. PATENT DOCUMENTS

| | | | |
|---|---|---|---|
| 2016/0315296 A1* | 10/2016 | Kimura | H01M 50/124 |
| 2017/0229745 A1 | 8/2017 | Oh et al. | |
| 2018/0190950 A1 | 7/2018 | Zeng et al. | |
| 2019/0214608 A1 | 7/2019 | Kimura et al. | |

* cited by examiner

CELL MODULE HAVING A PLURALITY OF ELECTROCHEMICAL POUCH CELLS

CROSS-REFERENCE TO RELATED APPLICATION

This application claims priority to German Patent Application No. 102021118402.9, filed Jul. 16, 2021, the content of such application being incorporated by reference herein in its entirety.

FIELD OF THE INVENTION

The invention relates to a cell module having a plurality of electrochemical pouch cells, wherein each pouch cell has at least a first and second electrode, a separator arranged between the electrodes, and a flexible outer sleeve. In addition, the invention relates to a vehicle having such a cell module.

BACKGROUND OF THE INVENTION

Pouch cells, also referred to as soft pack or coffee bag cells, are known from the prior art in various embodiments. They are a design of a lithium-ion rechargeable battery, wherein, in contrast to batteries with a hard housing (hardcase), the electrochemically active material is enclosed by a flexible outer sleeve, for example consisting of a plastic-aluminum composite film. Owing to this design, a pouch cell has a low weight and compact dimensions but, owing to the thin sleeve, is generally more susceptible to mechanical loading and damage from outside and can also enlarge its volume in the event of a rise in the cell internal pressure. Both influences need to be taken into consideration when the cells are combined to form a cell stack in order to ensure safe operation as well as a compact arrangement. In this connection, DE 10 2014 117 396 A1, which is incorporated by reference herein, discloses a module having a stack of cuboidal pouch cells in which the individual cells are oriented obliquely with respect to the stacking direction.

SUMMARY OF THE INVENTION

Described herein is a cell module in which the cells are combined in a stable and compact manner and are contact-connected efficiently within the cell module.

According to one example, a cell module having a plurality of electrochemical pouch cells is proposed, wherein each pouch cell has at least a first and second electrode, a separator arranged between the electrodes, and a flexible outer sleeve, wherein each pouch cell has a circular outer rim and a circular through-hole arranged in the center of the pouch cell, wherein an outer cell terminal is arranged on the outer rim of each pouch cell, and an inner cell terminal is arranged on a radially inner rim, wherein the cell module has an inner current collector in the form of a cylindrical rod and an outer current collector in the form of a cylinder jacket, wherein the inner current collector extends along a mid-axis of the cell module, and the outer current collector is arranged concentrically with respect to the inner current collector, wherein the pouch cells form a stack in the direction of the mid-axis and are arranged in such a way that the inner current collector passes through the through-holes in the pouch cells, wherein the inner cell terminals are electrically conductively connected to the inner current collector, and the outer cell terminals are electrically conductively connected to the outer current collector.

In the case of the cell module according to aspects of the invention, the individual pouch cells are arranged in a row on the central, inner current collector and are stacked one on top of the other in this way along the mid-axis. The cylindrical inner current collector in this case acts as guide and holding element for the pouch cells and at the same time functions so as to electrically contact-connect the inner cell poles.

Preferably, the individual pouch cells are substantially in the form of a circular disk or flat regular cylinder having a central through-hole, with the result that they can be positioned on the inner current collector and contact-connected in a simple and robust manner owing to this shape. In particular, the pouch cells of the cell module are all of identical design. The dimensions of the pouch cells are determined in the radial direction by the radius of the outer circumference and perpendicularly thereto by the extent in the thickness direction of the pouch cell. Preferably, the thickness of each pouch cell is at most as large as the radius of the outer circumference, particularly preferably at most as large as half the radius and very particularly preferably at most as large as a quarter of the radius. In addition to the inner current collector, the cell module has an outer current collector in the form of a cylinder jacket, which contact-connects the outer cell terminals of the pouch cells and at the same time forms a radial wall by means of which the cell stack is stably bordered. In this way, the pouch cells are mounted in a compact and safe manner, wherein the two current collectors, in addition to the electrical contact-connection, ensure a stable mechanical mounting or fixing of the cells.

Preferably, the pouch cells are metal-ion rechargeable batteries, in particular lithium-ion rechargeable batteries. The electrodes and the separator of each cell are in particular in the form of films. Each of the electrodes in this case has in particular a metallic layer which acts as current collector and a further layer consisting of an electrochemically active material which rests flat against the metal layer and preferably completely covers one of the two surfaces of the metal layer. The separator may be, for example, a porous layer impregnated with a liquid electrolyte. Also conceivable are solid polymer electrolytes which act both as separator and as ion conductor. The cell according to aspects of the invention has at least one anode and one cathode but can also have a plurality of anodes and cathodes which are arranged, for example, in the form of a stack in the cell. The current collectors of the anode and cathode, or of the anodes and cathodes, are each electrically conductively connected to one of the two cell terminals. Preferably, the current collector of the anode is connected to the inner (and therefore positive) cell terminal, and the current collector of the cathode is connected to the outer (and therefore negative) cell terminal. Alternatively, the inner cell terminal can also be the negative terminal, and the outer cell terminal the positive terminal.

The arrangement comprising electrodes and separator is in the case of each cell surrounded by a flexible outer sleeve, wherein the outer sleeve encloses the electrodes and the separator in particular in gas-tight and/or fluid-tight fashion. The outer sleeve can consist, for example, of a plastic-metal composite material. The inner and the outer current collectors preferably each consist of a metal such as, for example, copper or aluminum or a copper-containing and/or aluminum-containing alloy. For example, the inner current collector may be a rod-shaped solid or hollow cylinder. The outer current collector can be formed, for example, by a metal sheet shaped to form a cylinder jacket.

In accordance with one advantageous configuration of the invention, heat-conducting pads, gap pads, are arranged between the pouch cells. The heat-conducting pads are in particular circular disks having a centrally arranged through-hole, through which the inner current collector protrudes. In this way, the pouch cells and the heat-conducting pads form a stack along the current collector, with pouch cells and heat-conducting pads alternating in the stack. The inner current collector, therefore, in addition to contact-connecting the inner cell terminals, advantageously acts as holding element and guide for the heat-conducting pads. The radius of the radial extent of the heat-conducting pads is in particular at most as large as the radius of the pouch cells. Preferably, the radius of the heat-conducting pads is smaller than that of the pouch cells. The heat-conducting pads of the cell module are in particular all of identical design.

One advantageous configuration of the invention provides for the inner cell terminal to be formed by two strip-shaped conductors and/or the outer cell terminal to be formed by two strip-shaped conductors, wherein the two conductors extend in the radial direction and are arranged so as to be offset through 180° with respect to one another in the circumferential direction. In particular, the conductors can be strips of sheet metal, for example copper or aluminum. Alternatively, it is conceivable that the inner and/or the outer cell terminal extends in the form of a ring over the entire inner rim or outer rim of the pouch cell and rests on the inner or outer current collector over the entire (inner or outer) circumference.

One advantageous configuration of the invention provides for the inner cell terminal to be formed by at least three strip-shaped conductors and/or the outer cell terminal to be formed by at least three strip-shaped conductors, wherein the conductors extend in the radial direction and are arranged so as to be distributed uniformly over the circumferential direction. In other words, the inner and/or the outer cell terminal can each be formed by n strip-shaped conductors, which are offset through 360°/n with respect to one another.

In accordance with one advantageous configuration of the invention, the strip-shaped conductors of the inner cell terminal are welded to the inner current collector and/or the metal strips of the outer cell terminal are welded to the outer current collector. In this way, safe and mechanically loadable electrical contact-connection of the cells is ensured, wherein the welded cell terminals furthermore enable robust fixing of the cells within the cell module.

In accordance with one advantageous configuration of the invention, the outer current collector has cutouts, wherein the strip-shaped conductors of the outer cell terminal protrude through the cutouts and are welded to the radially outwardly pointing lateral surface of the outer cell terminal. Preferably, the cutouts are horizontal (i.e. running perpendicular to the mid-axis) slots, through which the strip-shaped conductors protrude. The conductors of the outer cell terminals are preferably bent back upwards or downwards outside the outer current collector and rest flat on the radially outwardly pointing surface of the outer current collector.

In accordance with one advantageous configuration of the invention, the cell module has an electrically insulating cover, wherein the cover is in the form of a pot and forms a radial outer wall and an upper end face of the cell module. In particular, the cover is positioned from above onto the cell stack and the outer current collector and forms, upwards and radially outwards, a protective and electrically insulating outer wall of the cell module.

In accordance with one advantageous configuration of the invention, the cover has a centrally arranged first cutout in the upper end face of the cell module, wherein the inner current collector protrudes through the first cutout. Preferably, the inner current collector protrudes in the direction of the mid-axis beyond the cover. Alternatively, the upper end face of the current collector can run planar-parallel with respect to the upper end face.

In accordance with one advantageous configuration of the invention, the outer current collector has a conductor which projects in the radial direction and forms a terminal of the cell module. Alternatively, the current collector can also have two or more radially projecting conductors which together form the terminal of the cell module. The radial conductors can in particular be arranged either on the upper rim of the outer current collector or on the lower rim thereof and can be formed, for example, integrally with the outer current collector.

Preferably, the conductor which projects in the radial direction protrudes through a second cutout in the cover, wherein the second cutout in the cover is arranged in particular in a lower rim of the cover.

As an alternative to the conductor which projects in the radial direction, and in accordance with a further advantageous configuration of the invention, the outer current collector has a conductor which runs perpendicular to the radial direction and forms a terminal of the cell module. As an alternative, the current collector can also have two or more vertical (i.e. running perpendicularly to the radial direction) conductors, which together form the terminal of the cell module. The vertical conductors can in particular be arranged either on the upper rim of the outer current collector or on the lower rim thereof and can be formed, for example, integrally with the outer current collector.

Preferably, the conductor which runs perpendicular to the radial direction protrudes through a third cutout in the upper end face of the cover.

A plurality of advantageous design possibilities, which will be described below, result for the pouch cells of the cell module according to aspects of the invention. The details are described in each case with reference to a single cell, wherein preferably all of the cells are configured identically. However, cell modules in which different embodiments of the pouch cell are combined are also conceivable.

In accordance with one advantageous configuration of the invention, provision is made for the pouch cell to have two ring-shaped contact elements, wherein a ring-shaped outer contact element is arranged on the outer rim of the pouch cell and a ring-shaped inner contact element is arranged on an inner rim of the through-hole in the pouch cell, wherein a current collector of the first electrode is electrically conductively connected to the inner contact element, and a current collector of the second electrode is electrically conductively connected to the outer contact element, wherein the flexible outer sleeve comprises two electrically insulating films, wherein each of the two films extends between the inner and the outer contact element, and the two films cover mutually opposite end sides of the pouch cell. The current collectors of the anode and cathode, or of the anodes and cathodes, are each electrically conductively connected to one of the two contact elements. For example, the current collector of the anode can be connected to the inner contact element, and the current collector of the cathode can be connected to the outer contact element, or vice versa. The inner and outer contact element is electrically conductive or has an electrical conductor, which contact-connects the respective current collector. Preferably, the contact elements consist of a metal, for example of the same metal as the respective current collector. The contact elements can either be flexible, for example film-like, or rigid. The outer sleeve of the pouch cell is formed by two films, which are each in the form of a circle and have a through-hole at their central point, wherein each of the two films extends between the inner and the outer contact element and in this way forms in each case one of the two end faces in the form of a circular ring of the cell. Preferably, each film is connected to the two contact elements. In order to form a seal-tight envelope, each of the two films can be connected, for example, in seal-tight fashion to the outer and/or the inner contact element. As an alternative or in addition, it is possible for a rim region, lying radially outwards, of the first film to be connected in seal-tight fashion to a rim region, lying radially outwards, of the second film (so that the outer contact element is completely enveloped by the two films) and/or a rim region, lying radially inwards, of the first film to be connected in seal-tight fashion to a rim region, lying radially inwards, of the second film (so that the inner contact element is completely enveloped by the two films). The outer contact element can protrude radially outwards between the two films or can be completely enclosed by the films. In addition or as an alternative, the inner contact element can protrude radially inwards between the two films or can be completely enclosed by the films. The respective contact element can protrude between the films over the entire inner or outer circumference or only over part of the circumference, while it is enclosed completely by the films over another part of the circumference. Preferably, the parts of the respective contact element which protrude between the films form a positive or negative cell terminal of the pouch cell. If the respective contact element is enclosed over the entire circumference by the films, the pouch cell in particular has additional conductive elements which protrude between the films and are conductively connected to the contact element, with the result that the conductive elements form a cell terminal of the pouch cell.

In accordance with one advantageous configuration of the invention, the pouch cell has a plurality of anodes and cathodes, wherein the anodes and cathodes are arranged in the form of a stack in a thickness direction of the pouch cell in such a way that anodes and cathodes alternate. In particular, the electrodes are in the form of identically shaped circular disks each having a circular through-hole arranged in their center. The electrodes are arranged one on top of the other in the stack, wherein the through-holes are coincident. Each electrode has a current collector, wherein the current collectors of the anodes are connected to the inner or the outer contact element, while the current collectors of the cathodes are connected to the respective other contact element.

Preferably, the current collectors of the anodes are conductively connected to the associated contact element in a radial rim region of the current collectors over the entire circumference and/or the current collectors of the cathodes are conductively connected to the associated contact element in a radial rim region of the current collectors over the entire circumference. In particular, the current collectors of the cathodes can be connected to the outer contact element in a rim region which lies radially outwards over the entire outer circumference of the current collectors, and the current collectors of the anodes can be connected to the inner contact element in a rim region which lies radially inwards over the entire inner circumference. Similarly, there is an alternative configuration in which the anodes are connected to the outer contact element, and the cathodes are connected to the inner contact element.

In accordance with a further advantageous configuration of the invention, the pouch cell has an anode and a cathode, wherein the anode and the cathode are arranged in the form of a spiral around the through-hole and form a cylindrical coil. In contrast to the stacked arrangement of the electrodes, here the cathode, the anode and the separator arranged therebetween are shaped to form a spiral, wherein the current collector of one electrode contact-connects the inner contact element at that end of the spiral which lies radially inwards, while the current collector of the other electrode contact-connects the outer contact element at that end of the spiral which lies radially outwards. In particular, the arrangement comprising the electrodes and the separator is present in the form of a spiral-shaped tape or strip, wherein the width of the tape or strip substantially corresponds to the thickness of the pouch cell.

One advantageous configuration of the invention provides for the pouch cell to have a first and second collector element, wherein the first collector element is electrically conductively connected to the inner contact element and electrically conductively contact-connects the current collector, running in the form of a spiral, of the first electrode at different radial positions, wherein the second collector element is electrically conductively connected to the outer contact element and electrically conductively contact-connects the current collector, running in the form of a spiral, of the second electrode at different radial positions. The collector elements extend in particular in a straight line running in the radial direction and connect the spiral-shaped current collectors to the respective contact element. Preferably, the first collector element runs so as to be offset through 90° or 180° with respect to the second collector element. The cell can also have four or more collector elements, wherein collector elements which contact-connect the current collector of the anode alternate in the circumferential direction with collector elements which contact-connect the current collector of the cathode. Preferably, the four or more current collectors run in the form of beams in the radial direction and enclose constant angles with one another, i.e. are distributed uniformly over the circumferential direction.

In accordance with one advantageous configuration of the invention, the inner and/or the outer contact element has an electrically conductive cell terminal, which extends over the entire inner rim or outer rim of the pouch cell. In this configuration, the inner cell terminal runs over the entire inner rim of the through-hole of the cell and/or the outer cell terminal runs over the entire outer rim of the cell. The cell terminals can in the simplest case be formed integrally with the contact elements or the contact elements can have ring-shaped cell terminals and connect the latter to the current collectors of the electrodes.

In accordance with one advantageous configuration of the invention, the inner and/or the outer contact element has a strip-shaped electrical conductor, which extends in the radial direction and forms a cell terminal of the pouch cell. In this embodiment, the cell terminals are not formed so as to run around over the entire circumference, but consist of conductive, in particular metallic strips, which project radially outwards or inwards and are used for the electrical contact-connection of the cell.

In accordance with one advantageous configuration of the invention, the inner and/or the outer contact element has at least two strip-shaped electrical conductors, which extend in the radial direction, wherein the strip-shaped electrical conductors are arranged so as to be distributed uniformly over the circumferential direction. In particular, the inner cell terminal is formed by two conductors, which protrude inwards at the inner rim of the through-hole and are arranged so as to be offset through 180° with respect to one another. Similarly, the outer cell terminal can be formed by two conductors, which protrude radially outwards at the outer rim of the cell and are arranged so as to be offset through 180° with respect to one another. Similarly, the inner and/or the outer cell terminal can in each case be formed by n strip-shaped conductors, which are offset through 360°/n with respect to one another.

In accordance with one advantageous configuration of the invention, the two films are welded and/or adhesively bonded to the inner and/or the outer contact element. In particular, the two films are welded and/or adhesively bonded in gas-tight and fluid-tight fashion to the inner and/or the outer contact element. In particular, the inner and/or the outer contact element protrude radially inwards or outwards beyond the films between the two films. The contact elements can in this case protrude over the films over the entire circumference or only over part of the circumference.

In accordance with one advantageous configuration of the invention, the two films are welded and/or adhesively bonded to one another at their inner radial rim and/or at their outer radial rim. In particular, the two films can be welded and/or adhesively bonded at their inner or outer rim over the entire inner or outer circumference and completely envelope the corresponding contact element. It is also conceivable for the contact elements to protrude over the films over a first part of the circumference and to be completely enveloped by the films over a second part of the circumference.

A further subject matter of the invention is a vehicle, having a configuration of the cell module according to aspects of the invention. The same configurations and advantages which have been described in relation to the cell module result for the vehicle.

BRIEF DESCRIPTION OF THE DRAWINGS

Further details and advantages of the invention will be described below with reference to the exemplary embodiments illustrated in the drawings, in which.

DETAILED DESCRIPTION OF THE INVENTION

Figure 1:
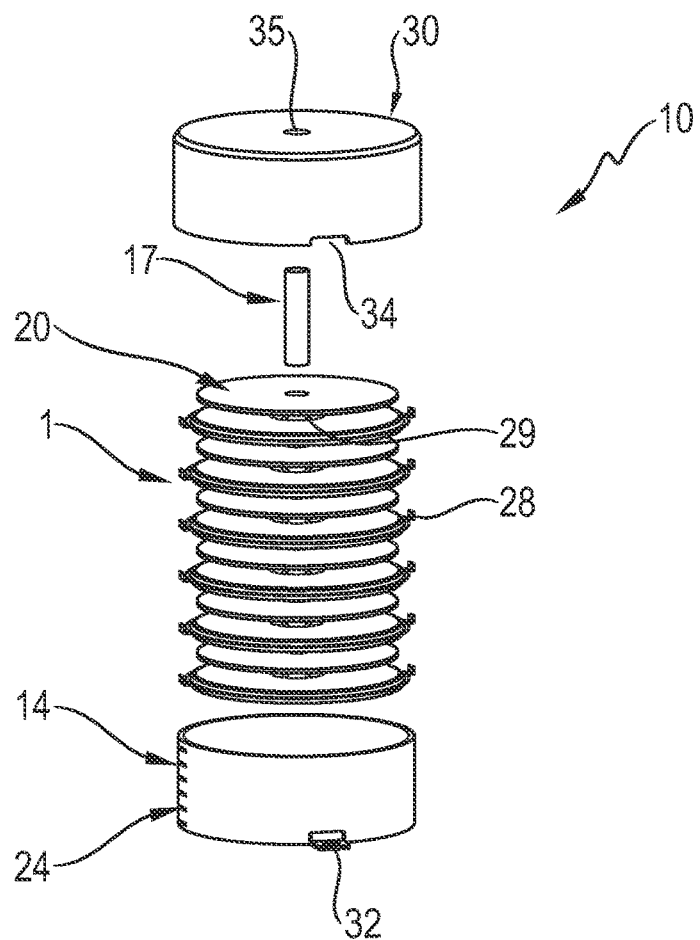
FIG. 1 shows the design of one embodiment of the cell module according to aspects of the invention in a schematic exploded illustration.

The illustration in FIG. 1 shows an exploded illustration of an embodiment of the cell module 10. The cell module 10 is formed by a stack of pouch cells 1, between which in each case one heat-conducting pad 20 (gap pad) is arranged. Each of the pouch cells 1 is substantially in the form of a circular disk having a centrally arranged through-hole 7, wherein an outer cell terminal 28 is arranged on the radial outer rim 8 of each cell 1, and an inner cell terminal 29 is arranged on the inner rim 9 of the through-hole 7 (for the design of the pouch cell, see FIG. 3). The cell terminals 28 and 29 of the cells 1 are each formed by two radially projecting metal strips 28, 29. The heat-conducting pads 20 are likewise circular disks having a central through-hole. The rod-shaped inner current collector 17, which is used both as holding element for the stack and for the electrical contact-connection of the inner cell terminals 29, passes through the through-holes 7 in the cells 1 and the through-holes in the pads 20. The outer cell terminals 28 are contact-connected by the outer current collector 14, which is formed by a metallic cylinder jacket 14. The cylindrical outer current collector 14 has slot-shaped cutouts 24, through which the outer cell terminals 28 protrude. In addition, the outer current collector 14 has a radially projecting connection 32 on its lower rim. An insulating cover 30, which has a centrally arranged through-hole 35 in its upper end face, through which through-hole the inner current collector 17 protrudes, is positioned onto the arrangement comprising cells 1, heat-conducting pads 20 and inner and outer current collectors 17, 14 from above. The upper end of the inner current collector 17 therefore forms a first terminal (for example the positive terminal) of the cell module 10, while the connection element 32, which protrudes out of the cutout 34 arranged in the lower rim of the cover 30, forms the opposite terminal.

Figure 2:
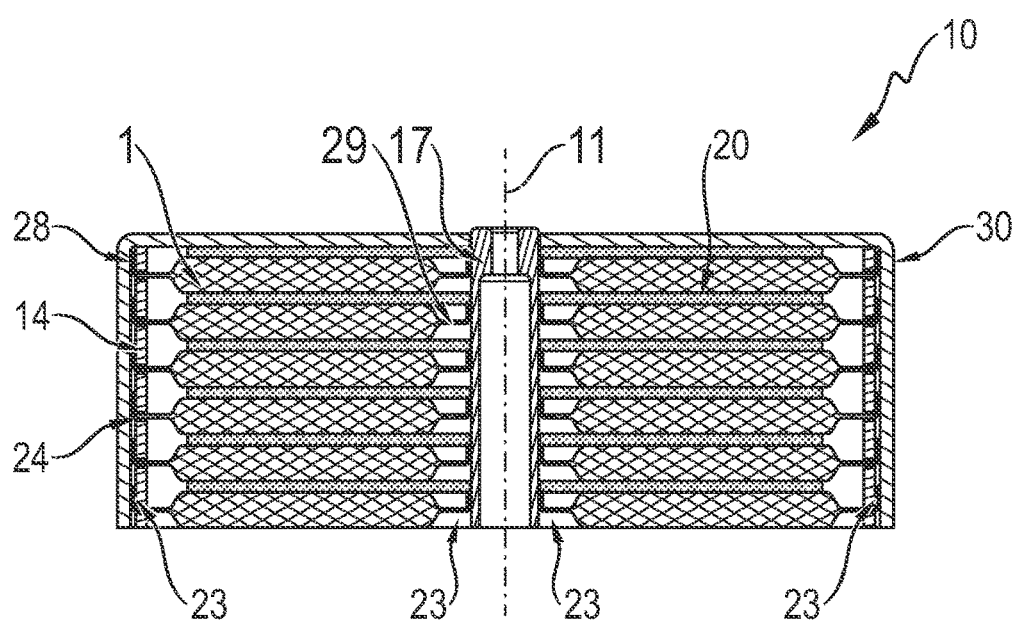
FIG. 2 shows the design of the embodiment of the cell module according to aspects of the invention in a sectional illustration.

The illustration in FIG. 2 shows the module 10 from FIG. 1 in the assembled state in a sectional illustration. The vertical stack comprising pouch cells 1 and heat-conducting pads 20 is held and stably mounted by the inner and the outer current collector 17, 14. The inner current collector 17, which extends along the mid-axis 11 of the module 10, is in the form of a metallic hollow cylinder, wherein the lower section of the hollow cylinder 17 has a larger inner radius than the upper section. The inner cell terminals 29 of the cells 1 are formed by two metal strips 29, which protrude radially inwards in the through-hole 7 in the cell 1 and are bent in such a way that they rest flat against the lateral surface of the inner current collector 29. The outer cell terminals 28 are likewise formed by two metal strips, which are directed radially outwards and protrude through the slot-shaped cutouts 24 in the outer current collector 14. The metal strips of the outer cell terminals 28 are likewise bent and rest flat against the radially outwardly pointing surface of the outer current collector 14. The inner terminals 29 are welded to the inner current collector 17, and the outer terminals are welded to the outer current collector 14, with the result that a safe and mechanically loadable electrical contact-connection is ensured.

Figure 3:
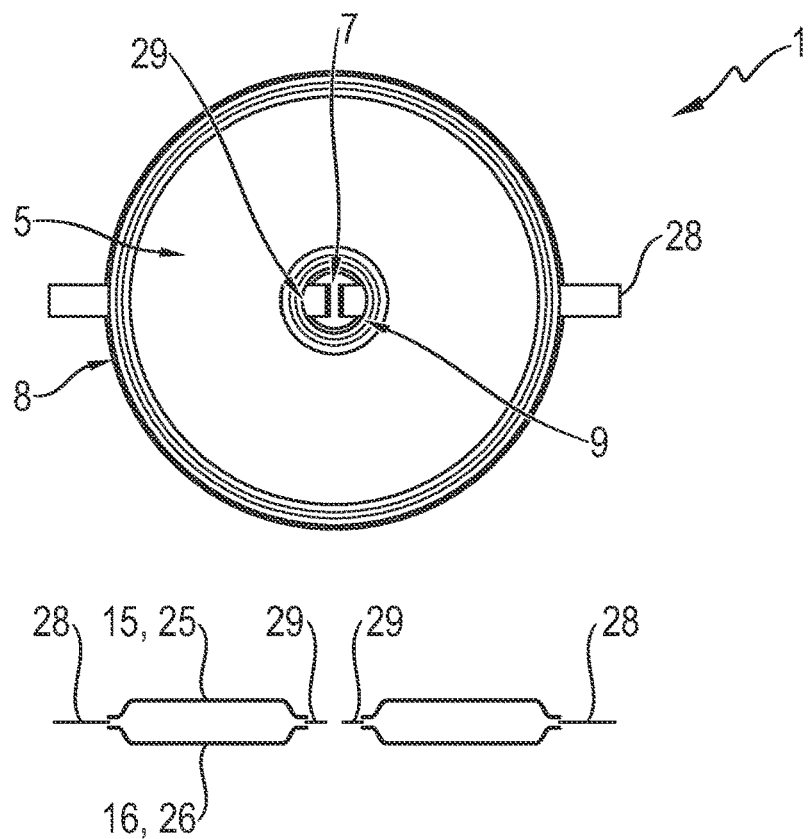
FIG. 3 shows an embodiment of the pouch cell.

The illustration in FIG. 3 shows the design of the pouch cells 1 from FIG. 1 and FIG. 2. The illustration at the top shows a plan view of the cell 1, while a schematic section is depicted below. The cell 1 has a circular outer rim 8 and a central through-hole 7 having a likewise circular inner rim 9. The electrodes 2, 3 of the cell are enclosed in gas-tight and fluid-tight fashion by the flexible outer sleeve 5, wherein the sleeve 5 is formed from two films 15, 16, which each cover the upper and lower end face 15, 16 of the cell 1. The cell terminals 28, 29 are formed by four metal strips 28, 29, wherein the outer terminals 28 project radially outwards from the outer rim 8 of the cell and are arranged so as to be offset through 180° with respect to one another along the circumference, while the inner terminals 29 project radially inwards in the through-hole 7 and are likewise offset through 180° with respect to one another.

Figure 4:
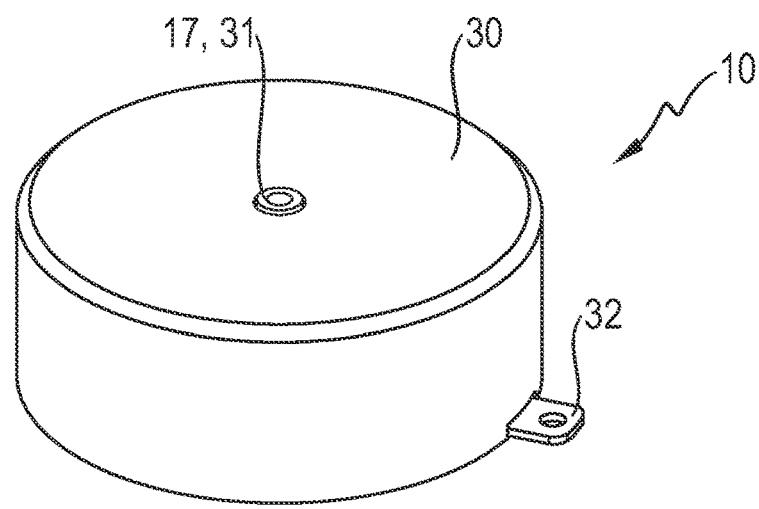
FIG. 4 shows an embodiment of the cell module according to aspects of the invention having a cover.

The illustration in FIG. 4 shows the cell module 10 having the electrically insulating cover 30. The positive terminal 31 of the module 10 is formed by the inner current collector 17, which protrudes slightly out of the opening 35 in the cover 30. The negative terminal 32 is formed by the connection element 32 protruding out of the cutout 34 arranged in the lower rim of the cover 30.

Figure 5:
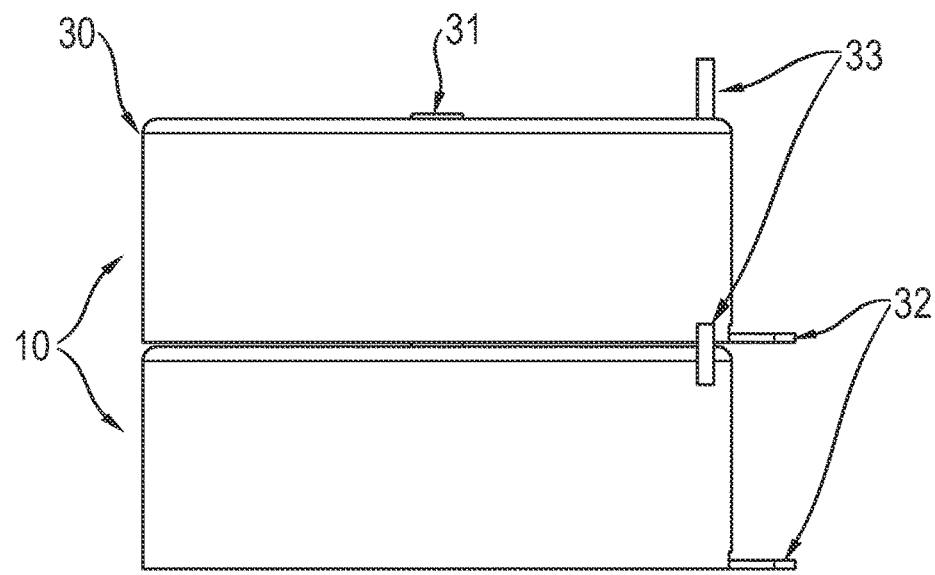
FIG. 5 shows two cell modules stacked one on top of the other.

The illustration in FIG. 5 shows two cell modules 10 stacked one on top of the other. For example, the modules 10 can be designed in such a way that the lower side of the upper module 10 latches in on the upper end face of the cover 30 in order to ensure precise positioning. In addition to the connections 32 which point radially outwards, the illustration shows an alternative configuration in which connections 33 run vertically.

Figure 6:
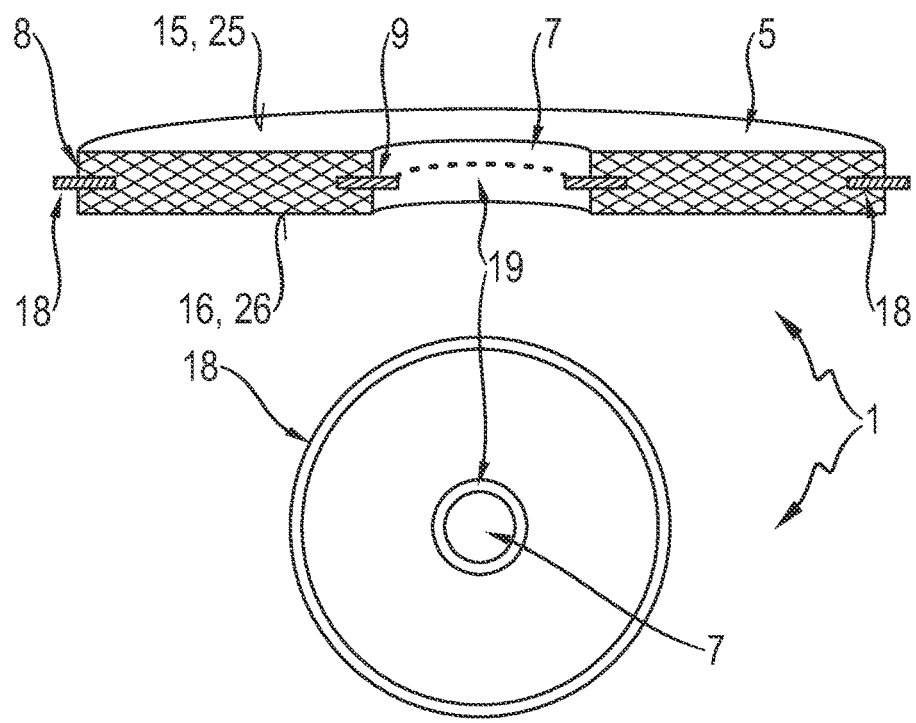
FIG. 6 shows the design of an embodiment of the pouch cell in a schematic illustration.

The illustration in FIG. 6 illustrates the schematic design of an embodiment of the pouch cell 1. In this case, the illustration at the top shows a side view having a section through the cell 1 and the illustration at the bottom shows a plan view of the cell 1. The cell 1 is substantially in the form of a circular disk and has, in its center, a likewise circular through-hole 7. A ring-shaped outer contact element 18 is arranged on the circular outer rim 8 of the cell 1, while an inner contact element 19 is arranged on the circular inner rim 9 of the through-hole 7. The contact elements 18, 19 extend in each case over the entire inner or outer rim 9, 8 and are used for the electrical contact-connection of the electrodes 2, 3 in the interior of the cell 1 (cf. FIG. 7 and FIG. 8). Two flexible films 15, 16, which are connected to the two contact elements 18, 19 and cover the upper and lower end sides 25, 26 of the cell 1, extend between the contact elements 18, 19. Together, the two films 15, 16 form the flexible outer sleeve 5 of the cell 1, in which the electrochemically active components are enclosed in gas-tight and fluid-tight fashion. The inner design will be described further below with reference to FIG. 7 and FIG. 8.

The connection of the conductors 28, 29 from FIG. 3 to the contact elements 18, 19 in FIG. 6 can be realized differently. For example, the two films 15, 16 can be connected to the respective (inner or outer) contact element 18, 19, and the contact element 18, 19 can protrude outwards between the films 15, 16 over the entire circumference. The metal strips 28, 29 can then be connected to that part of the contact element 18, 19 which protrudes outwards or can be formed integrally therewith. The contact elements 18, 19 can, however, also be enclosed completely by the films 15, 16 (for example by virtue of the outer and inner rim regions of the films 15, 16 being welded or adhesively bonded to one another), with the result that only the terminals 28, 29 which are connected to the contact elements 18, 19 protrude outwards between the films 15, 16.

Figure 7:
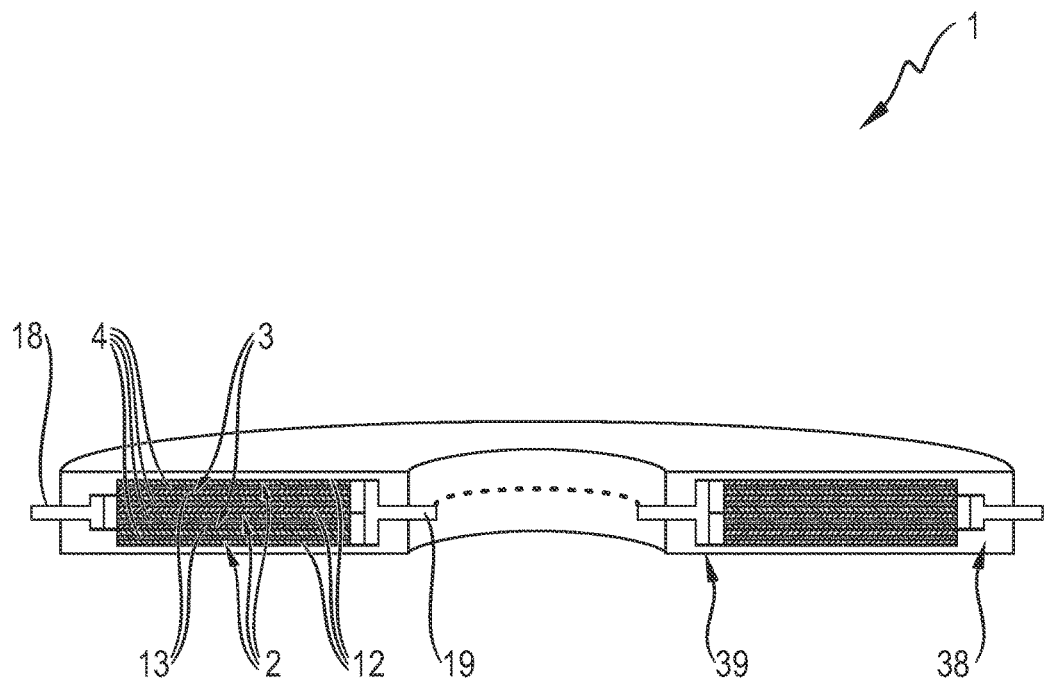
FIG. 7 shows a stacked arrangement of the electrodes in the interior of the pouch cell.

The illustration in FIG. 7 shows a sectional illustration of the inner design of a first variant of the pouch cell 1. In this configuration, the electrodes 2, 3 are arranged in the form of a stack in the cell 1. The electrodes 2 connected to the inner contact element 19 can be the cathodes, for example, and the electrodes connected to the outer contact element 18 can be the anodes. For the description, the reverse assignment is assumed. The configuration therefore consists of three anodes 2, two cathodes 3 (or three cathodes 2, two anodes 3) and four separators 4, each arranged between the anode and the cathode 2, 3. The stacking sequence of the electrodes 2, 3 therefore results as anode, cathode, anode, cathode, anode. Each of the electrodes 2, 3 consists of a flat current collector 12 or 13, which is coated with the respective active material of the electrode 2, 3. Each individual electrode 2, 3 and the associated separators 4 are in the form of a circular disk having a central through-hole, wherein the current collectors 12 of the anodes 2 are combined via the inner contact-connection 39 and are conductively connected to the inner contact element 19, while the current collectors 13 of the cathodes 3 are combined via the outer contact-connection 38 and connected to the outer contact element 18. The contact-connections 38, 39 connect the current collectors 13, 12 to the respective contact element 18, 19 in each case over the entire inner or outer circumference. In this way, by means of the contact elements 18, 19, a large-area and correspondingly low-resistance contact-connection of the electrodes 2, 3 is achieved and at the same time a correspondingly large-area connection to the outside is provided.

The depicted configuration should merely be understood schematically and by way of example. The number of anodes and cathodes 2, 3 in the pouch cell 1 according to aspects of the invention is not restricted to the illustrated number and, instead of the illustrated assignment between anode 2 and cathode 3 and the inner and outer contact element 19, 18, respectively, it is also possible, conversely, for the electrode 2 connected to the inner element 19 to form the cathode and for the electrode 3 connected to the outer element 18 to form the anode.

Figure 8:
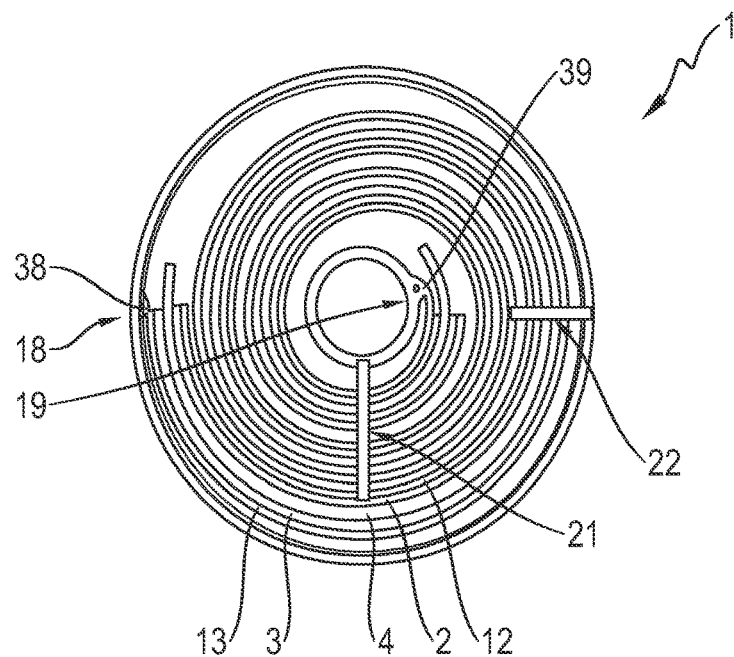
FIG. 8 shows a coiled arrangement of the electrodes in the interior of the pouch cell.

In the second variant illustrated in FIG. 8, the electrodes 2, 3 are present as a cylindrical coil, in contrast to the stacked arrangement from FIG. 7. The first electrode 2 (which is preferably the anode), the second electrode 3 (preferably the cathode) and the separator layer 4 arranged between them form a spiral, which is arranged between the inner and outer contact element 19, 18, wherein the first electrode 2 is connected to the inner contact element 19 at the contact point 39, while the second electrode 3 is connected to the outer contact element at the contact point 38. In addition to the direct contact points 38, 39, the cell 1 furthermore has two additional collector elements 21, 22, which contact-connect the current collectors 12, 13, running in the form of a spiral, of the electrodes 2, 3 at different radial positions and in this way improve the connection of the electrodes 2, 3 to the contact elements 18, 19. The first collector element 21 for this purpose runs in the radial direction and ends on the inner contact element 19, while the second collector element 22 runs in a radial direction perpendicular thereto and ends on the outer contact element 18. The cell 1 can also have four, six or more collector elements 21, 22, which run in the form of beams in the radial direction and are used for alternately contact-connecting the first or second electrode 2, 3.

LIST OF REFERENCE SYMBOLS 1 pouch cell
2 first electrode
3 second electrode
4 separator
5 outer sleeve
7 through-hole
8 outer rim
9 inner rim
10 cell module
11 mid-axis
12 current collector of first electrode
13 current collector of second electrode
14 outer current collector
15 first film
16 second film 17 inner current collector
18 outer contact element
19 inner contact element
20 heat-conducting pad
21 first collector element
22 second collector element
23 welding of cell terminals
24 cutouts
25 first end side of pouch cell
26 second end side of pouch cell
28 outer cell terminal
29 inner cell terminal
30 cover
31 positive terminal of cell module
32 radial negative terminal of cell module
33 vertical negative terminal of cell module
34 cutout in cover
35 through-hole in cover
38 contact-connection of second electrode
39 contact-connection of first electrode

What is claimed is:

1. A cell module comprising:
a plurality of electrochemical pouch cells, wherein each of the plurality of electrochemical pouch cells has at least a first electrode, a second electrode, a separator arranged between the first electrode and the second electrode, a flexible outer sleeve, a circular outer rim, a circular through-hole arranged in a center of each of the plurality of electrochemical pouch cells, an outer cell terminal arranged on the circular outer rim, and an inner cell terminal arranged on an inner rim of the circular through-hole;
an inner current collector in the form of a cylindrical rod that extends along a mid-axis of the cell module; and
an outer current collector in the form of a cylinder jacket that is arranged concentrically with respect to the inner current collector,
wherein the pouch cells form a stack in the direction of the mid-axis of the cell module and are arranged in such a way that the inner current collector passes through the through-hole in each of the plurality of electrochemical pouch cells, and
wherein, for each of the plurality of electrochemical pouch cells, the inner cell terminal is electrically conductively connected to the inner current collector, and the outer cell terminal is electrically conductively connected to the outer current collector.

2. The cell module as claimed in claim 1, further comprising heat-conducting pads and/or gap pads arranged between the pouch cells.

3. The cell module as claimed in claim 1, wherein the inner cell terminal is formed by two strip-shaped conductors and/or the outer cell terminal is formed by two strip-shaped conductors, wherein the two strip-shaped conductors extend in a radial direction and are arranged so as to be offset through 180° with respect to one another in a circumferential direction.

4. The cell module as claimed in claim 1, wherein the inner cell terminal is formed by at least three strip-shaped conductors and/or the outer cell terminal is formed by at least three strip-shaped conductors, wherein the three strip-shaped conductors extend in a radial direction and are arranged so as to be distributed uniformly over a circumferential direction.

5. The cell module as claimed in claim 4, wherein the strip-shaped conductors of the inner cell terminal are welded to the inner current collector and/or the strip-shaped conductors of the outer cell terminal are welded to the outer current collector.

6. The cell module as claimed in claim 5, wherein the outer current collector has cutouts, wherein the strip-shaped conductors of the outer cell terminal protrude through the cutouts and are welded to a radially outwardly pointing lateral surface of the outer cell terminal.

7. The cell module as claimed in in claim 1, wherein the cell module has an electrically insulating cover in a form of a pot that forms a radial outer wall and an upper end face of the cell module.

8. The cell module as claimed in claim 7, wherein the electrically insulating cover has a centrally arranged first cutout in the upper end face of the cell module, and wherein the inner current collector protrudes through the centrally arranged first cutout.

9. The cell module as claimed in claim 7, wherein the outer current collector has a conductor which projects in a radial direction and forms a terminal of the cell module.

10. The cell module as claimed in claim 7, wherein the conductor projects in the radial direction and protrudes through a cutout in the cover, wherein the cutout in the cover is arranged in a lower rim of the cover.

11. The cell module as claimed in claim 7, wherein the outer current collector has a conductor which runs perpendicular to a radial direction and forms a terminal of the cell module.

12. The cell module as claimed in claim 11, wherein the conductor protrudes through a cutout in the upper end face of the cover.

13. A vehicle having the cell module as claimed in claim 1.

* * * * *